(12) United States Patent
Holzschuh et al.

(10) Patent No.: US 9,835,036 B2
(45) Date of Patent: Dec. 5, 2017

(54) COMPRESSOR WHEEL

(71) Applicant: Bosch Mahle Turbo Systems GmbH & Co. KG, Stuttgart (DE)

(72) Inventors: Christian Holzschuh, Stuttgart (DE); Andreas Haas, Essingen (DE); Martin Schlegl, Rudersberg (DE); Christian Peschke, Stuttgart (DE)

(73) Assignee: Bosch Mahle Turbo Systems & Co. KG (DE)

( * ) Notice: Subject to any disclaimer, the term of this patent is extended or adjusted under 35 U.S.C. 154(b) by 174 days.

(21) Appl. No.: 14/558,693

(22) Filed: Dec. 2, 2014

(65) Prior Publication Data
US 2015/0152740 A1 Jun. 4, 2015

(30) Foreign Application Priority Data

Dec. 3, 2013 (DE) .................. 10 2013 224 755
Jun. 25, 2014 (DE) .................. 10 2014 212 227

(51) Int. Cl.
*F01D 5/28* (2006.01)
*F01D 5/04* (2006.01)
*B23P 15/00* (2006.01)

(52) U.S. Cl.
CPC .......... *F01D 5/288* (2013.01); *B23P 15/006* (2013.01); *F01D 5/046* (2013.01); *F05D 2220/40* (2013.01); *Y10T 29/49321* (2015.01); *Y10T 29/49337* (2015.01)

(58) Field of Classification Search
CPC ........ B23P 15/006; F01D 5/046; F01D 5/288; F05D 2220/40; Y10T 29/49321; Y10T 29/49337

USPC ................................. 60/597, 605.1
See application file for complete search history.

(56) References Cited

U.S. PATENT DOCUMENTS 4,904,542 A * 2/1990 Mroczkowski ..... C23C 14/0652
416/241 B

FOREIGN PATENT DOCUMENTS

| DE | 102009007648 A1 | 8/2010 |
| DE | 102010000816 A1 | 7/2011 |
| EP | 2725235 A1 | 4/2014 |

OTHER PUBLICATIONS

Machine Translation DE 10 2010 000 816 done Dec. 24, 2016.*
English Abstract for DE 102009007648.
English Abstract for DE 102010000816.
English Abstract for EP 2725235.
Search Report for DE 102014212227.9, dated May 13, 2015, 8 pp.

* cited by examiner

*Primary Examiner* — Mark Laurenzi
*Assistant Examiner* — Dapinder Singh
(74) *Attorney, Agent, or Firm* — Fishman Stewart PLLC

(57) ABSTRACT

A compressor wheel for an internal combustion engine may include a plurality of blades which in a circumferential direction of the wheel are spaced from one another. The plurality of blades may respectively include an inflow edge which during operation are subject to an inflow of a compressible fluid substantially axially to the wheel axis. The plurality of blades may include a surface layer of locally distinct materials to adapt to locally distinct loads during operation.

20 Claims, 3 Drawing Sheets

COMPRESSOR WHEEL

CROSS-REFERENCE TO RELATED APPLICATIONS

This application claims priority to German Patent Application No. 10 2013 224 755.9, filed Dec. 3, 2013, and German Patent Application No. 10 2014 212 227.9, filed Jun. 25, 2014, both of which are hereby incorporated by reference in their entirety.

TECHNICAL FIELD

The invention relates to a compressor wheel, in particular for a rotor of an exhaust gas turbocharger on an engine with internal combustion, with blades which are spaced from one another in circumferential direction of the wheel, which during the compressor operation are subjected to the admission of a compressible fluid, in particular to an exhaust gas of a combustion process on the engine side flowing in under low pressure.

The invention additionally relates to the production of such a compressor wheel.

BACKGROUND

To reduce the emission of nitrogen oxides it is known with internal combustion, in particular in diesel engines, to provide exhaust gas recirculation so that a larger or smaller amount of exhaust gas is supplied in each case to the combustion process of the engine. In this connection, a high-pressure exhaust gas recirculation is known on the one hand and a low-pressure exhaust gas recirculation on the other hand.

With the high-pressure exhaust gas recirculation, hot exhaust gases with up to 400° C. are recirculated to the inlet side of the internal combustion engine. This results in the disadvantage that the air fed to the internal combustion process is greatly heated up and accordingly is only able to make available little oxygen to the internal combustion processes so that the power of the internal combustion engine that can be achieved remains correspondingly low.

With the low-pressure exhaust gas recirculation, the exhaust gases to be recirculated are extracted from the exhaust line at a greater distance from the engine and at correspondingly significantly reduced temperatures and, subject to intermixing with cooled combustion air, directed to the inlet side of the engine. If the efficiency of the engine is to be increased by an exhaust gas turbocharger now this is synonymous to having to compress the cool exhaust gas-air mixture from the compressor wheel of the turbocharger in its compressor stage before, as a rule after flowing through a charge air cooler, it flows into the combustion chambers of the engine. In this way, high performances of the combustion engine with little emission of nitrogen oxides are possible, but the compressor wheel is subjected to extraordinary loading since abrasively acting particles and corrosively acting components are carried along in the recirculated exhaust gas. These are in particular oil and water-containing condensates which because of dew point undershooting develop in the exhaust gas and can lead to cavitation. For this reason, the endeavour in general has been to avoid condensation of steams in the recirculated exhaust gas before the compressor stage of the turbocharger. For this purpose, elaborate measures for separating the steam carried along in the recirculated exhaust gas have been provided up to now.

SUMMARY

This is where the invention comes in and sets itself the object of rendering elaborate measures for the particle and steam separation from the recirculated exhaust gas superfluous.

According to the invention, this object is solved in that the compressor wheel being adapted to locally distinct loads during the compressor operation has a surface of locally distinct materials.

The invention is based on the general idea of providing, instead of a surface layer of a "uniform material", distinct surface materials locally on the compressor wheel, which are optimally adapted to the respective local loading of the compressor wheel during the compressor operation. It thereby becomes possible to realise a new concept for the exhaust gas recirculation on supercharged internal combustion engines in which an elaborate separation of abrasive particles or media having a tendency to cavitation from the recirculated exhaust gas can be omitted since the blades of the compressor wheel have sufficiently durable and wear-resistant blade surfaces or edges in regions that are subjected to abrasive or cavitation loading and are otherwise sufficiently corrosion-resistant.

To this end, the invention utilises the realisation that the blades are primarily subjected to high mechanical load on its edges on the inflow side through abrasive particles and cavitation processes and the like while the blade surfaces are substantially exposed only to the chemical aggressiveness of the recirculated exhaust gases, in particular to sulphurous acid and sulphuric acid contained therein.

Accordingly it is preferably provided to merely design the blade surfaces outside the edges on the inflow side in an anti-corrosive manner and to only provide the blade edges on the inflow side with "armour".

If appropriate, the armour can also be anti-corrosively coated if the materials provided for the armour do not have adequate long-term stability relative to the corrosive components of the recirculated exhaust gases.

A particular advantage of the invention lies in that such a compressor wheel at least in its embodiment as a radial compressor wheel, as is regularly provided in typical turbochargers, can be produced with comparatively little production effort. It is advantageous, furthermore, that with locally distinct surface materials any strength limits of the base material of the compressor wheel can be taken into account. Accordingly, thin and correspondingly low-weight surface layers can be provided in such regions which at high rotational speeds are subjected to particularly high loads through the surface material and centrifugal forces accompanied by that.

In this connection it must be initially emphasised that the compressor wheel according to the invention can consist of aluminium or a comparable light metal. Advantageously, a low weight and a correspondingly low moment of inertia can thereby be achieved. Because of the locally distinct surface materials according to the invention, no reductions in terms of the lifespan have to be accepted despite the only limited durability of the aluminium material.

If appropriate, the surface materials can be formed or composed locally distinctly.

The surface layer forming the armour of the inflow edges of the blades of the compressor wheel can extend to a greater or lesser degree over the blade surfaces following the inflow edge.

In a particularly preferred manner it is provided as a rule however that the coating forming the armour in each case is provided on a blade end face located in a radial plane of the compressor wheel. Such an armour can be realised particularly easily from a production point of view, as is shown further down below. For producing the surface layers, any known coating methods are suitable in principle such as plasma spraying, flame and high-speed flame spraying, cold gas spraying, arc spraying as well as PVD and CVD methods. Particularly suitable are layers which are galvanically deposited or defused in with the help of a plasma.

According to a preferred method for producing a compressor wheel according to the invention, a solid blank of aluminium or of the light metal provided for the compressor wheel is initially produced as a rule. In a preferred manner, this can be effected by casting. Accordingly, the blank is given a shape such that its outer surface corresponds to an enveloping surface of the compressor wheel to be created. Since in the case of radial compressor wheels the inflow edges of the blades are typically located in a radial plane of the compressor wheel such a blank typically has a circular disc-shaped radial face end. The latter can in a subsequent machining process be entirely or partly formed into a surface of armour material or be correspondingly coated, wherein because of the flat shape of the mentioned face end and the possible large-area layer on the surface of this end a very good bond between surface material and the base material of the blank is achieved. Accordingly, the blank which is provided with armour material on the face end is machined in a chip-removing or material-removing manner in order to produce the desired blades of the compressor wheel. In this way, the desired radial compressor wheel can then be produced with armoured inflow edges. In a final processing step, the blade surfaces and the intermediate spaces between the blades can then be anti-corrosively treated, wherein the anti-corrosive surface layer can be produced in the form of substrate-specific deposit and/or diffusion layers and in the form of substrate-extraneous deposit and/or diffusion layers. In the case of adequately corrosion-resistant armour material it is sufficient if merely the surface regions adjoining the armoured edges of the blades are formed in an anti-corrosive manner. In this case, the anti-corrosive surface layer thus butt-joins the armour of the inflow edges.

Instead it is also possible to extend the anti-corrosive surface layer to a greater or lesser degree over the armoured inflow edges.

Otherwise, reference, with respect to preferred features of the invention, is made to the claims and the following explanation of the drawing with the help of which particularly preferred embodiments of the compressor wheel according to the invention and a preferred form of production are described in more detail.

Protection is not only claimed for the feature combinations stated or shown, the shown or stated features can rather be substantial to the invention also individually.

BRIEF DESCRIPTION OF THE DRAWINGS

In the drawing it shows.

DETAILED DESCRIPTION

Figure 1:
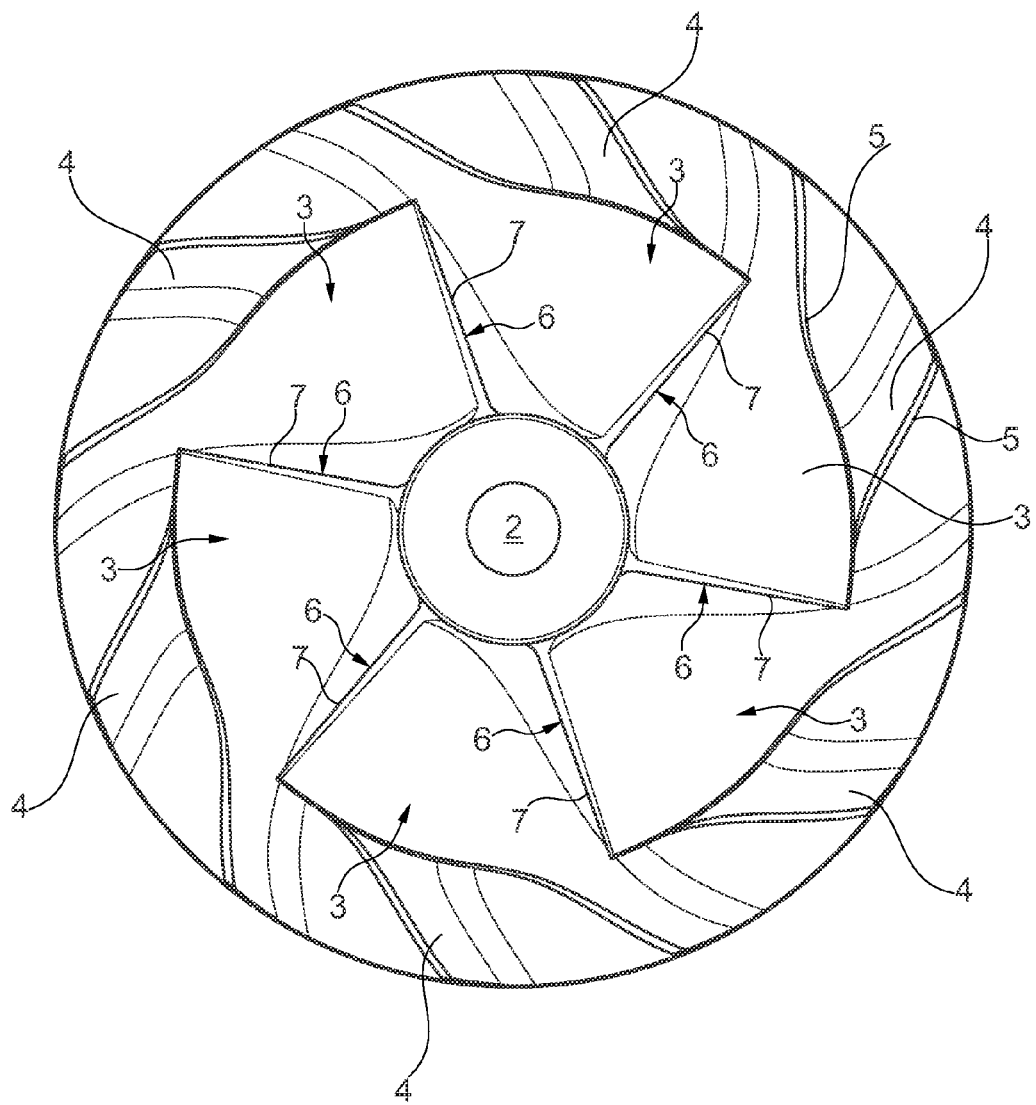
FIG. 1 a top view of the inflow side of a radial compressor wheel according to the invention, FIG. 2 a perspective lateral view of a blank serving for the production of a radial compressor wheel according to the invention, FIG. 3 a representation corresponding to FIG. 2, with the help of which the coating of the face end of the blank on the inflow side with armour material is shown, and FIG. 4 a perspective front view of a radial compressor wheel created through material removal from the blank shown in FIG. 3.

The radial compressor wheel 1 shown in FIG. 1 has a central axial bore 2, with which the radial compressor wheel 1 can be arranged on a corresponding section of a rotor shaft, which in the case of a turbocharger connects the compressor wheel 1 to a turbine wheel in a rotationally fixed manner. During the operation of the turbocharger, the turbine wheel is driven within a turbine housing by an exhaust gas flow of an internal combustion engine and then in turn drives the radial compressor wheel 1. In the shown example, the latter has six main blades 3, between auxiliary blades 4 are arranged in each case. All blades 3 and 4 have contoured edges 5, the shape of which is matched to the profile of the inside of a compressor housing which is not shown, which receives the radial compressor wheel 1. Accordingly, the contours of the edges 5 and the inner surface of the inner housing are matched to one another so that as close as possible a "sealing gap" is formed.

The compressor housing has an inlet that is axial with respect to the access of the compressor wheel, which directs air to be compressed by the compressor wheel 1 or other gases to the inflow edges 6 of the main blades 3 of the compressor wheel 1. The inflow edges 6 as a rule lie in a radial plane of the compressor wheel 1 that is common to all inflow edges 6. The inflow edges of the auxiliary blades 4 as a rule are axially offset to the back relative to the inflow edges 6 of the main blades 3 and are therefore not visible in the representation of FIG. 1.

The inflow edges 6 of the main blades 3 are subjected to extraordinarily high mechanical loading during the compressor operation in the case of low-pressure exhaust gas recirculation, be it through abrasive particles or condensate particles and cavitation of water or oil mists.

In order to be able to ensure a long lifespan of the compressor wheel 1 despite this, the inflow edges 6 of the main blades 3 are provided with armour 7, which can extend to a greater or lesser degree over the blade surfaces adjoining the inflow edges 6. For producing the armour 7, any coating methods can be employed in principle, as has already been explained further up.

The inflow edges of the auxiliary blades 4 which are offset towards the back in axial direction of the compressor wheel 1 in the drawing are subjected to only comparatively low loading so that armour is not required there. However, all surfaces of the compressor wheel 1, which are subjected to the fluid to be compressed, are exposed to the corrosive influence of chemically aggressive components of the fluid to be compressed, in particular sulphuric acid and sulphurous acid. It is therefore provided according to the invention to anti-corrosively coat these surfaces. Accordingly, the anti-corrosive coating can butt-join the armour 7. Instead, it is also possible to let the anti-corrosive coating overlap the armour 7 at least in regions.

Figure 2:
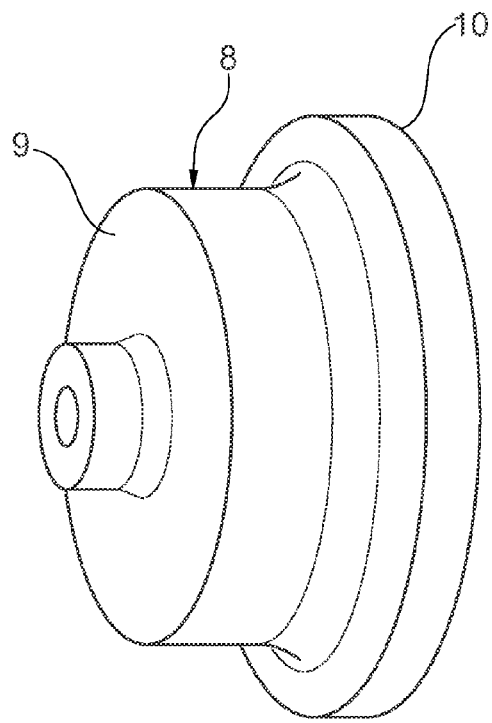
Figure 3:
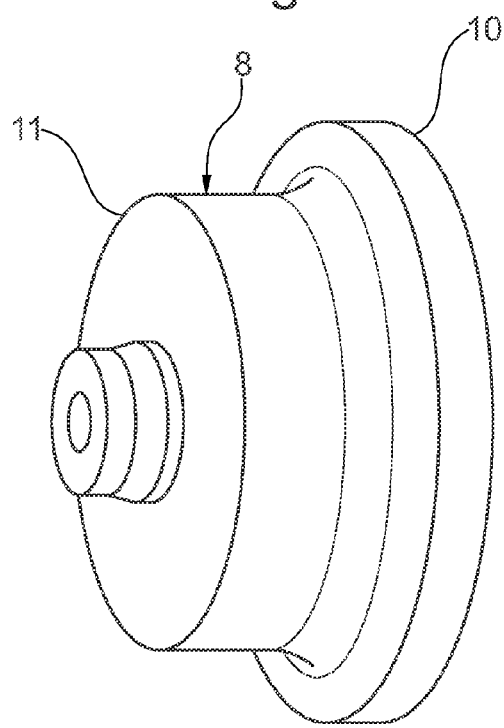
Figure 4:
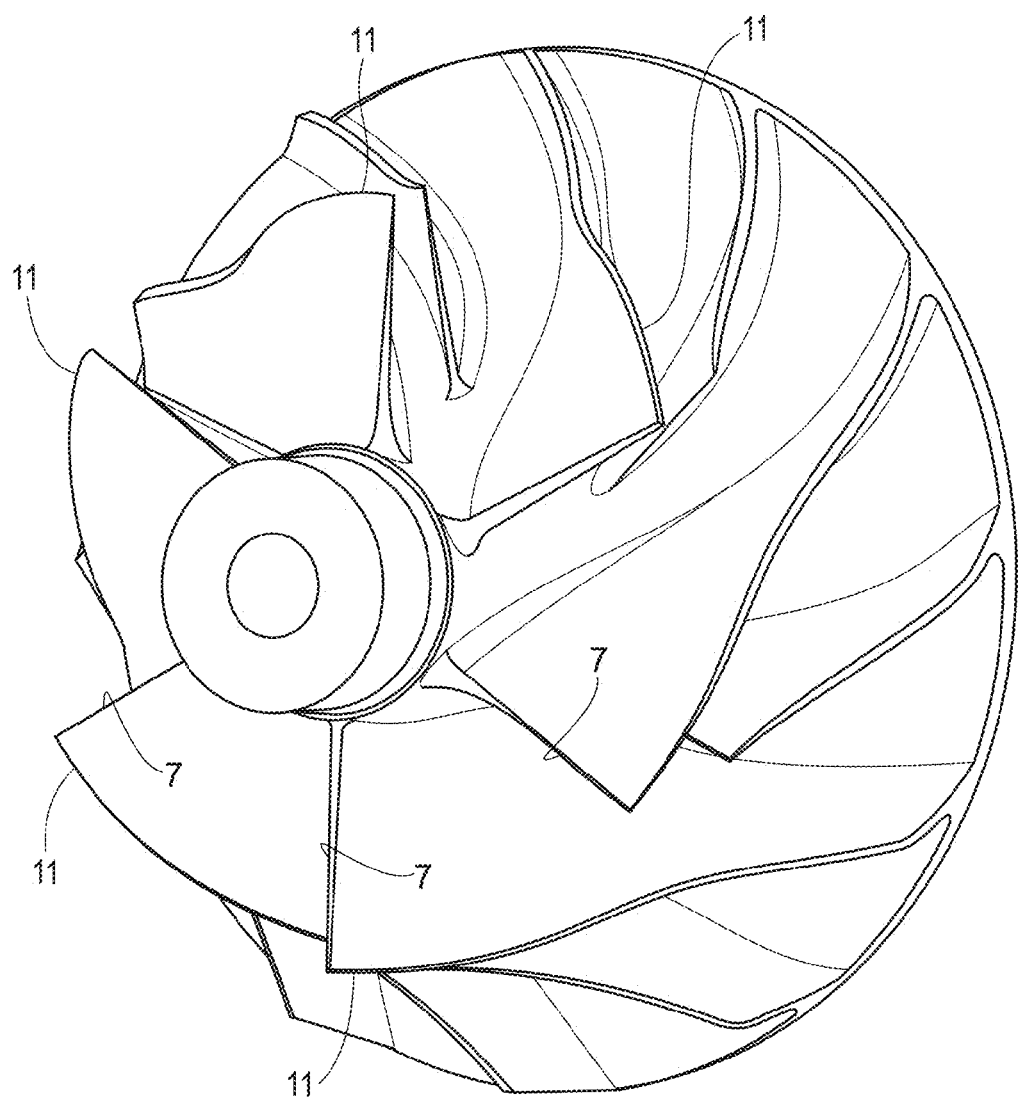

In the following, a first preferred method for producing a compressor wheel 1 is explained in more detail. Initially, a blank 8, see FIG. 2, is produced, for example by casting. This blank 8 has an outer surface having the form of an enveloping surface of the compressor wheel 1 to be produced, see for example FIG. 1. This blank 8 has a small face end 9 in the region of the inflow edges 6 of the main blades 3 still to be produced and a large face end 10 on the opposite side of the blank 8.

In a following method step at least one radially outer annular zone of the small face end 9 is cleaned through material removal, which in the case of a blank 8 formed as a cast body means removing the casting skin.

The cleaned annular zone is subsequently coated with a material provided for armouring the inflow edges 6 of the main blades 3, so that a coated or armoured annular zone 11 that is more or less wide is formed.

Now, the main and auxiliary blades 3, 4 of the desired compressor wheel are produced through material removal, for example by means of chip-removing tools. This is synonymous to producing the free spaces intended between the desired blades. In the region of these free spaces, the coating with the armour material is also cleared on the small face end in the process.

As a result, merely the inflow edges 6 of the main blades 3 on the face end of the small face end 9 remain with face end armour. Since the coating with the armour material was initially applied onto the comparatively large and non-stepped small face end 9 and the close bond between the armour material and the material of the blank 8 thus formed is not subjected to any impairment during its subsequent chip-removing machining for forming the blades 3 and 4, excellent adhesion of the armoured inflow edges 6 on the main blades 3 is ensured. Through material-removing finishing the armoured inflow edges can be provided with an aerodynamically optimal profile. This material removal can be performed in the sense of precision balancing in such a manner that any unbalances on the compressor wheel 1 to be produced are avoided.

Following the production of the blades 3 and 4, all surfaces of the compressor wheel 1 subjected to the fluid to be compressed are additionally treated anti-corrosively on and between the blades 3 and 4. Following a renewed precision balancing process if required, the desired compressor wheel is then completed.

In the method described preceding this, the material provided for the armour forms a layer on the small face end of the blank or on the edges of the compressor wheels on the inflow side that is of a substrate-specific material.

According to a second preferred method for producing a compressor wheel, the armour material can also be provided as a substrate-specific deposit or diffusion layer.

With this second method, additionally a blank 8 is again produced from the base material intended for the compressor wheel later on, for example cast. Following this, material is again removed from the small face end 9, i.e. in the case the blank is produced by casting, the casting skin is removed on a radially outer annular zone of the small end face 9.

Following this, a physical-chemical treatment of the cleaned small face end 9 takes place in order to change the material structure of the surface layer of the small face end 9 in terms of "armouring". In a preferred manner, a PDO layer (plasma electrolytic oxidation) is created, namely with specifiable thickness of the PEO layer.

This is then followed with chip-removing machining of the blank by the production of the compressor wheel blades, wherein the inflow edges of the main blades located in the plane of the small end face 9 have armouring in the form of a PEO layer.

In a third preferred production method, a blank 8 is initially produced again from a base material to be specified, for example cast, which is then cleaned in a chip-removing manner. Following this, the compressor wheel blades are formed through chip-removing machining. The inflow edges of the compressor wheel blades and the blade regions axially following the inflow edges are now physically-chemically processed in order to form a surface layer of armour material on the inflow edges and the following blade regions. Preferentially, a PEO surface layer is again produced which according to a preferred embodiment of the invention can extend over up to 30% of the axial length of the compressor wheel.

The above representations of the production process where based on a radial compressor wheel 1 whose main blades 3 comprise inflow edges 6 which extend in a radial plane of the compressor wheel 1 and accordingly are linear. In principle, compressor wheels shaped differently with differently shaped inflow edges 6 can also be produced from a blank 8 the outside of which forms an enveloping surface of the desired compressor wheel 1. If appropriate, the face end of the blank containing the subsequent onflow edges will then have to have a curved, rotation-symmetrical form. In addition to this, the mentioned face end could also be designed wavy in such a manner that it contains inflow edges which are alternatingly provided in different axial positions of the compressor wheel.

The invention thus utilises the realisation that elaborate design measures in the exhaust path in the case of low-pressure exhaust gas recirculation are superfluous when the compressor wheel arranged in the exhaust gas recirculation path has corrosion-resistant surfaces which are armoured in regions that are subject to high mechanical loads. In the invention, the realisation is used in particular that on the one hand armouring that is limited to the inflow edges 6 of the blades of the compressor wheel and on the other hand anti-corrosive treatment or coating of the remaining blade surfaces in the case of a compressor wheel having a basic body of aluminium or a comparable light metal are adequate. The production of the compressor wheel according to the invention can be effected in a simple manner that initially a blank of aluminium or light metal is created, the outer surface of which substantially has the form of an enveloping surface of the desired compressor wheel. Such a blank comprises an end face containing the inflow edges of the compressor blades of the compressor wheel to be produced on which initially, at least in a radially outer annular region, a surface of armour material is created over the entire area. Since the mentioned end face although arched or curved if appropriate, but is free of steps in the vicinity of the inflow edges of the compressor blades still to be produced, a sound tightly adhesive bond between the armour material and the aluminium or light metal of the blank provided as base material is ensured. In the following, the compressor wheel blades can then be produced in that the blank provided with armour material on the aforementioned end face is machined in a material-removing or chip-removing manner. Following this, anti-corrosive coating of the compressor wheel produced in this manner takes place.

In all embodiments, the end faces of the compressor wheel preferentially remain without armour in its central bore.

With respect to suitable methods, in particular for the anti-corrosive coatings, reference can exemplarily be made to the following methods:
plasma spraying, flame and high-speed flame spraying, cold gas spraying, arc spraying, PVD and CVD methods.

The surface layers of armour material can on the one hand be formed through substrate-extraneous deposit or diffusion layers and in particular consist of steel, nickel, cobalt and/or titanium alloys.

On the other hand, substrate-specific deposit or diffusion layers are possible and under the aspect of cost-effective production are particularly preferred, this applies in particular to PEO layers.

In particular aluminium is provided as base material of the compressor wheel. Other light metals, such as for example magnesium and/or titanium are however likewise suitable.

The invention claimed is:

1. A compressor wheel for an internal combustion engine, comprising:
   a body rotatable about a rotation axis and a plurality of blades disposed on the body and spaced from one another in a circumferential direction of the rotation axis, the plurality of blades respectively including an inflow edge which during operation are subjected to an inflow of a compressible fluid substantially axially to the rotation axis, wherein the plurality of blades respectively include a surface of locally distinct materials resistant to locally distinct loads during operation; and
   wherein the surface of at least one blade of the plurality of blades includes an armour material disposed locally along the inflow edge and an anti-corrosive coating disposed in a region of the surface spaced away from the inflow edge.

2. The compressor wheel according to claim 1, wherein the anti-corrosive coating includes an anodised layer.

3. The compressor wheel according to claim 1, wherein the armour material and the anti-corrosive coating are disposed adjacently in an axial direction of the rotation axis.

4. A compressor wheel according to claim 3, wherein the armour material in the axial direction of the compressor wheel extends over a length of approximately 10 to 40% of an axial blade length.

5. The compressor wheel according to claim 1, wherein the armour material includes a plasma electrolytic oxidation (PEO) layer.

6. The compressor wheel according to claim 1, wherein the plurality of blades includes a main blade and an auxiliary blade alternating in the circumferential direction, wherein the inflow edges of the main blades are arranged in a plane positioned upstream relative to a plane of the inflow edges of the auxiliary blades with respect to a flow direction of the fluid to be compressed.

7. The compressor wheel according to claim 1, wherein the armour material is substantially provided only directly on the inflow edge.

8. The compressor wheel according to claim 1, wherein the surface of the at least one blade has the armour material only on the inflow edge, and wherein the surface of the at least one blade outside of the inflow edge is without the armour material.

9. The compressor wheel according to claim 1, wherein the plurality of blades includes main blades having inflow edges extending in a radial plane of the compressor wheel.

10. The compressor wheel according to claim 1, wherein the body is a radial compressor wheel.

11. The compressor wheel according to claim 1, wherein the body is composed of a material including at least one of aluminium, magnesium and titanium.

12. The compressor wheel according to claim 1, wherein the at least one blade defines an axial blade length and the armour material extends over 10 to 40% of the axial blade length.

13. The compressor wheel according to claim 1, wherein the anti-corrosive coating includes at least one of a thermally sprayed layer, a physical vapor deposition layer, and a chemical vapor deposition layer.

14. The compressor wheel according to claim 1, wherein the armour material includes at least one of a steel alloy, a nickel-based alloy, a cobalt alloy and a titanium alloy.

15. An exhaust gas turbocharger for an internal combustion engine, comprising:
    a compressor wheel including a central axial bore for receiving a rotor shaft;
    a plurality of circumferentially spaced blades disposed on the compressor wheel each including an inflow edge, the plurality of blades further including a plurality of main blades alternating in a circumferential direction with a plurality of auxiliary blades, wherein the inflow edge of the main blades are arranged in a plane positioned upstream relative to a plane of the inflow edge of the auxiliary blades with respect to a flow direction; and
    wherein at least one main blade has a surface of locally distinct materials, the surface of locally distinct materials including an armour material disposed on the inflow edge and an anti-corrosive coating disposed in a region spaced axially away from the inflow edge with respect to the central axial bore.

16. The exhaust gas turbocharger according to claim 15, wherein the armour material includes a plasma electrolytic oxidation layer.

17. The exhaust gas turbocharger according to claim 15, wherein the armour material and the anti-corrosive coating adjoin one another in an axial direction of the central axial bore.

18. The exhaust gas turbocharger according to claim 15, wherein the anti-corrosive coating is disposed to butt-join the armour material on the inflow edge.

19. The exhaust gas turbocharger according to claim 18, wherein the armour material is provided only on the inflow edge, and wherein the surface of the at least one main blade outside of the inflow edge is without the armour material.

20. The exhaust gas turbocharger according to claim 15, wherein the anti-corrosive coating at least partially overlaps the armour material.

* * * * *